(12) United States Patent
Rathod et al.

(10) Patent No.: US 9,002,167 B2
(45) Date of Patent: Apr. 7, 2015

(54) OPTICAL FIBER MANAGEMENT BRIDGE

(71) Applicant: Google Technology Holdings LLC, Mountain View, CA (US)

(72) Inventors: Vipul D. Rathod, North Wales, PA (US); Dennis P. Conroy, Sellersville, PA (US); Jamie J. Swift, Levittown, PA (US); David M. Thibeault, Furlong, PA (US); Thomas M. Weiss, Telford, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 183 days.

(21) Appl. No.: 13/645,781

(22) Filed: Oct. 5, 2012

(65) Prior Publication Data

US 2014/0101709 A1     Apr. 10, 2014

(51) Int. Cl.
*G02B 6/00* (2006.01)
*G02B 6/46* (2006.01)
*H04B 10/20* (2006.01)
*H04N 21/61* (2011.01)
*G02B 6/26* (2006.01)

(52) U.S. Cl.
CPC ........................................ *G02B 6/26* (2013.01)

(58) Field of Classification Search
USPC ................. 385/100–109, 135, 136, 137, 147; 725/98, 129; 398/58
See application file for complete search history.

(56) References Cited

U.S. PATENT DOCUMENTS

| | | | | |
|---|---|---|---|---|
| 5,668,911 | A * | 9/1997 | Debortoli | 385/135 |
| 5,987,207 | A * | 11/1999 | Hoke | 385/135 |
| 8,020,813 | B1 | 9/2011 | Clark et al. | |
| 8,023,287 | B2 * | 9/2011 | Tachikawa et al. | 361/826 |
| 8,593,828 | B2 * | 11/2013 | Blackwell et al. | 361/810 |
| 8,660,397 | B2 * | 2/2014 | Giraud et al. | 385/135 |
| 8,718,436 | B2 * | 5/2014 | Barnes et al. | 385/136 |
| 2006/0280419 | A1 * | 12/2006 | Mahoney et al. | 385/135 |
| 2008/0292249 | A1 | 11/2008 | Kimura et al. | |
| 2011/0085771 | A1 | 4/2011 | Matsuyama et al. | |
| 2012/0008900 | A1 | 1/2012 | Schneider | |

OTHER PUBLICATIONS

Patent Cooperation Treaty, International Search Report and Written Opinion of the International Searching Authority for International Application No. PCT/US2013/061808, Nov. 19, 2013, 8 pages.

* cited by examiner

*Primary Examiner* — Akm Enayet Ullah
(74) *Attorney, Agent, or Firm* — Honigman Miller Schwartz and Cohn LLP (57) ABSTRACT

An improved optical fiber management bridge 100 can comprise an optical hinge 152 for an electronics communications device 112 which is especially useful for a broadband network 104. The electronics communications device can have a housing 120 for enclosing an electronics package 114 comprising at least one optical module 118 and optical fibers 108. The optical bridge can have optical surfaces 156 for supporting portions of the optical fibers 108 which are routed and extend between the top 128 and base 122 of the housing 120. The optical bridge can have an intermediate portion 163 for accommodating safe transition of the optical fibers 108 over the hinge line 129 of the housing 120.

19 Claims, 3 Drawing Sheets

OPTICAL FIBER MANAGEMENT BRIDGE

BACKGROUND

1. Field of the Disclosure

The disclosure relates in general to broadband networks and, more particularly, to a bridge for use with optical fibers in a broadband network.

2. Background Art

Fiber optic communications are a method of transmitting information by sending pulses of light through an optical fiber. The light forms an electromagnetic carrier wave that is modulated to carry information. Fiber optics communications are useful in broadband networks for telecommunications, data transmission, internet communications, high definition (HD) television, digital video streaming, video on demand (VOD) and other communications.

Due to much lower attenuation and interference, optical fibers provide many advantages over existing copper wire in long-distance and high-demand applications. Because of its advantages over electrical transmission, optical fibers have largely replaced copper wire in networks.

Fiber optic communications can include: transmitting the optical signal, relaying the signal along the fiber, maintaining the strength of the signal so that it does not become too distorted or weak, receiving the optical signal, and converting it into an electrical signal. Fiber optic communication systems usually have: an optical transmitter to convert an electrical signal into an optical signal to send into the optical fiber, a cable containing bundles of multiple optical fibers that are routed through underground conduits and buildings, multiple kinds of amplifiers, and an optical receiver to recover the signal as an electrical signal. The information transmitted is often digital information generated by computers, telephone systems, and cable television companies.

Hybrid fiber-coaxial (HFC) is a telecommunications industry term for a broadband network which combines optical fibers and coaxial cable. It has been commonly employed globally by cable television operators. The fiber optic network can extend from the cable operators' headquarters or master headend, sometimes to regional headends, then to a neighborhood's hub site, and subsequently to a fiber optic node which can serve numerous locations, such as 25 to 2,000 homes. A regional or area headend or hub can receive the video signal from the master headend and add to it the public, educational, and government access cable TV channels as required by local franchising authorities, or insert targeted advertising that would appeal to a local area. The various services are encoded, modulated and converted onto radio frequency (RF) carriers, combined onto a single electrical signal and inserted into a broadband optical transmitter. The optical transmitter converts the electrical signal to a downstream optically modulated signal that is sent to the nodes. Fiber optic cables can connect the headend or hub to optical nodes. A fiber optic node can have a broadband optical receiver which converts the downstream optically modulated signal coming from the headend or hub to an electrical signal going to the homes.

The optical portion of the network can provide a large amount of flexibility. If there are not many fiber optic cables to the node, wavelength division multiplexing can be utilized to combine multiple optical signals onto the same fiber. Optical filters are used to combine and split optical wavelengths onto the single fiber.

The coaxial portion of the network can connect numerous locations, such as 25 to 2,000 homes, in a tree-and-branch configuration off of the node. Radio frequency (RF) amplifiers can be used at intervals to overcome cable attenuation and passive losses of the electrical signals caused by splitting or tapping of the coaxial cable. Trunk coaxial cables can be connected to the optical node and form a coaxial backbone to which smaller distribution cables connect. Trunk cables also carry alternation current (AC) power which can be added to the cable line by a power supply. From the trunk cables, smaller distribution cables can be connected to a port of the trunk amplifier to carry the RF signal and the AC power down individual streets. The distribution line can be tapped into and used to connect the individual drops to customer homes and businesses.

By using frequency division multiplexing, an HFC network can carry a variety of services, including: analog TV, digital TV (SDTV or HDTV), video on demand, telephony, and high-speed data.

The HFC network can be operated bi-directionally, so that signals are carried in both directions on the same network from the headend/or hub office to the home or business, and from the home or business to the headend or hub office. The forward-path or downstream signals carry information from the headend or hub office to the home, such as video streaming, voice and internet data. The return-path or upstream signals carry information from the home or business to the headend or hub office, such as control signals to order a movie or internet data or to send an email. The forward-path and the return-path are often carried over the same coaxial cable in both directions between the optical node and the home or business.

An optical fiber can comprise: a core, cladding, and a buffer providing a protective outer coating, in which the cladding guides the light along the core. The core and the cladding, which has a lower-refractive-index, can be made of high-quality silica glass, although they can both be made of plastic as well. Connecting two optical fibers can be accomplished by fusion or mechanical splicing. Two main types of optical fiber used in optic communications include multimode optical fibers and single-mode optical fibers. A multi-mode optical fiber has a larger core ($\geq 50$ micrometers), allowing less precise, inexpensive transmitters and receivers to connect to it and cheaper connectors. A multi-mode fiber, however, can cause multimode distortion, which often limits the bandwidth and length of the link. Multi-mode fibers are often expensive and exhibit higher attenuation. The core of a single-mode fiber is smaller (<10 micrometers) and requires more expensive components and interconnection methods, but allows much longer, higher-performance links. In order to package fiber into a commercially-viable product, it is typically protectively-coated by using ultraviolet (UV), light-cured coating such as acrylate polymers, then terminated with optical fiber connectors, and finally assembled into a cable.

The choice between optical fiber and electrical (or copper) transmission for a particular system is made based on a number of trade-offs. Optical fiber is generally chosen for systems requiring higher bandwidth or spanning longer distances than electrical cabling can accommodate. The main benefits of fiber are its exceptionally low loss of signals allowing long distances between amplifiers/repeaters, its absence of ground currents, other parasite signal and power issues common to long parallel electric conductor runs, and its inherently high data-carrying capacity. Thousands of electrical links would be required to replace a single high bandwidth fiber cable. Another benefit of fibers is that even when run alongside each other for long distances, fiber cables experience effectively no crosstalk, in contrast to some types of electrical transmission lines. Fiber can be installed in areas with high electromagnetic interference, such as alongside utility lines and power lines. Optical fibers are now also increasingly used to carry signals over very short distances within individual electronic devices because of their extremely large bandwidth and ability to carry large amounts of data over a single fiber in both directions simultaneously.

The transmission distance of a fiber-optic communication system has traditionally been limited by fiber attenuation and fiber distortion. By using optical-electronic repeaters, these problems have been minimized or eliminated. Optical electrical repeaters convert the signal into an electrical signal, and then use a transmitter to send the signal again at a higher intensity than it was before. An alternative approach is to use an optical amplifier, which amplifies the optical signal directly without having to convert the signal into an electrical signal. It can be accomplished by doping a length of fiber, such as with the rare-earth mineral erbium, and pumping it with light from a laser with a shorter wavelength than the communications signal. Optical amplifiers have largely replaced optical-electrical repeaters in new installations.

Optical fibers can break if bent to a very small radius. If an optical fiber is bent too sharply, signals from light traveling in the core of the fiber can actually escape through the cladding and be lost.

Many electronic devices, including portable ones, for which minimizing their size is a significant design goal, employ mechanisms, such as hinges, for folding parts of the device upon each other to expand or contract the access or profile of the device as needed. Generally, at least some circuits within a base part of the device on one side of a hinged connection have to electronically communicate with circuits in another part of the of the device and must cross the hinges. Such requirements present design difficulties in terms of creating a flexible and/or moveable on electrical signal path that can survive repeated bending, flexing, translation or other movement.

Presently, there is no solution in the market place to protect optical fibers as they cross the hinge-line of a HFC optical node. For optical nodes used in line pole pedestal applications, the management of fibers is crucial. There are two sides to these optical nodes; one is considered the base and the other is considered the lid. In general, the fiber optical cable from the plant enters the lid side of the product. Once inside the product, the fiber is managed via fiber trays instituted inside the node. The fiber then terminates into the optical transmitters and receivers that are also in the lid side of the node. The problem is that when these optical modules are installed in the base side of the node, then the fiber needs to cross what is called the hinge-line of the node. This is the area where the node opens and closes and in this area the fiber has high risk of getting pinched.

Some conventional nodes and hubs, separate RF and optical portions with a conventional arrangement in which only electrical connections cross the lid hinge. This arrangement still has the potential for pinched wires and stress on termination connectors. In other conventional nodes and hubs, the customer must resort to self-help to coil and secure the numerous fiber jumpers crossing the hinge. In still other conventional nodes and hubs, different types of plastic spiral wrap and holders are used to secure cables crossing the hinge, but these more rigid solutions have been a major source of customer complaints due to connector stress and intermittent connections.

A living hinge is a thin flexible hinge. It is typically thinned or cut to allow the rigid pieces to bend along the line of the hinge. The minimal friction and very little wear in a living hinge makes it useful in the design of microelectromechanical systems. Living hinges can flex more than a million cycles without failure. Historically, in 1957, an unusual phenomenon was noticed by engineers studying pigment dispersion in very thin-walled color chips. Below a certain thickness, polypropylene molecules oriented in the direction of flow. Bending perpendicular to this orientation resulted in a stronger part that did not break with repeated flexing. Bob Munns, coined the term "living hinge" and the name stuck. The living hinge has been since used in numerous products.

It is, therefore, desirable to provide an improved bridge for use with optical fibers, such as for use in a broadband network.

SUMMARY

An improved bridge provides an optical living hinge for use with optical fibers, such as for use in a broadband network, which is effective, economical and durable. Advantageously, the optical hinge creates a bridge that goes over the hinge-line of a housing which will protect the fiber from getting pinched. The bridge can control the fiber bend radius in a closed node position. Desirably, the optical hinge creates a bridge inside which the fiber can reside safely while the node is opened and closed.

This improved optical fiber management bridge can allow for optical modules to be installed in the base side of the node and accommodate a safe transition for the fiber over the hinge-line. The improved optical fiber management bridge also provides a new and unique solution that addresses the major issues with optical fiber management within a strand mounted node.

The optical hinge forms a bridge made of flexible material. This bridge can be installed at the hinge-line of the optical node. The fiber can safely reside in the bridge and still allow the node to open and close properly. The bridge can have a predefined shape when the node is open and when closed will flex and roll inside of the node. The fiber bridge design controls the bend radius of the secured fibers and provides a safe hinge crossing for stress sensitive fiber jumpers. The bridge can be made of polypropylene homopolymer, that when designed as a living-hinge-like part, is rated for over 1 million flexing.

In the preferred form, an improved optical fiber management bridge is provided for an electronics communications device which is especially useful for a broadband network. The electronics communications device can have a housing for enclosing an electronics package. The electronics package can comprise at least one optical module and optical fibers which can extend and be routed between the base and top of the housing. The optical module can be located in the base of the node and preferably comprises an optical amplifier and optical passives.

The housing can have moveable sections which can include a base providing a bottom and a top providing a lid. In use, the housing is moveable and pivotable from an open position to access the electronic package to a closed position to cover and enclose the electronics package.

The improved optical fiber management bridge can comprise an optical hinge which can have a surface(s) secured to the base and top of the housing for hingeably and pivotally connecting the moveable sections. Advantageously, the bridge can have optical fiber-supporting surfaces which can provide one or more optical beds for supporting, cushioning and receiving portions of the optical fibers which are routed and extend between the top and base (bottom) of the housing. The optical fibers can securely lie upon the optical bed in the open and closed positions of the housing. The optical hinge can have an intermediate portion for accommodating safe transition of the optical fibers over the hinge line of the housing. The hinge can comprise of a flexible bridge which can have a predetermined expanded shape when the housing is open and a contracted bent shape when the housing is closed for accommodating flexing and rolling inside the housing.

The optical fibers can comprise: single mode optical fibers, multiple mode optical fibers, fiber optic cables, fiber jumpers, and combinations of any of the preceding. Desirably, the optical bridge provides a safe hinge crossing for stress sensitive fiber jumpers. Optical fasteners can be provided for securing the optical fibers to the optical bridge. The optical fasteners can comprise: crimped fastening bars comprising elongated transverse bars with crimped end portions; and/or twist ties, harnesses, straps, or clamps.

The optical bridge can comprise: an elongated optical bridge, a flexible optical bridge, an elastomeric optical bridge, a resilient optical bridge, or combinations of any of the preceding. The optical bridge can be formed or fabricated of polyethylene or preferably polypropylene.

The electronics communications device can comprise: an optical node, a hybrid fiber-coaxial (HFC) optical node, a strand mounted wireless node, an optical hub, an optical amplifier, a wavelength division multiplexing module, an electronic communication module, a digital television broadcast module, a digital video transmitter, a digital video receiver, a digital video transceiver, a digital video streaming device, a telecommunications device, or combinations of any of the preceding.

The optical fiber management bridge as recited in the patent claims produced unexpected surprisingly good results.

A more detailed explanation is provided in the following detailed descriptions and appended claims taken in conjunction with the accompanying drawings.

DETAILED DESCRIPTION

As shown in FIGS. 1-6 in the drawings, an optical fiber management bridge 100 can provide an optical hinge assembly 102 for use with a broadband network 104 comprising a hybrid fiber-coaxial (HFC) broadband access network (BAN) 106 with optical fibers 108 and coaxial cables 110 for providing digital communications, such as: digital television, high definition television (HDTV), digital video, digital video streaming, video on demand (VOD), data transmission, internet communications, radio frequency (RF) communications, telephone communications, computer communications, telecommunications, or combinations of any of the preceding. The optical fibers can comprise: single mode optical fibers, multiple mode optical fibers, fiber optic cables, fiber jumpers, or combinations of any of the preceding optical fibers.

The BAN can include a HFC optical module 112 (FIGS. 1-3) which can provide an electronics communications device with an electronics package (e-pack) 114 in a container 116. The HFC optical module and e-pack can also include an optical package 118, such as an optical amplifier and optical passives located in the base of the node. The HFC optical module can comprise a HFC optical node and/or a strand mounted wireless node.

Figure 1:
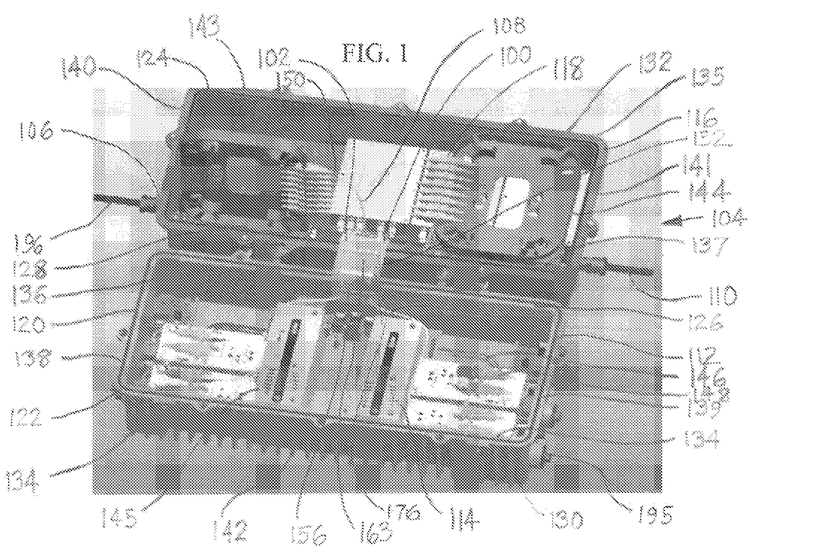
FIG. 1 is a perspective view of a strand mounted hybrid fiber-coaxial (HFC) optical node in an open position with an optical fiber management bridge in accordance with principle of the present disclosure.
Figure 2:
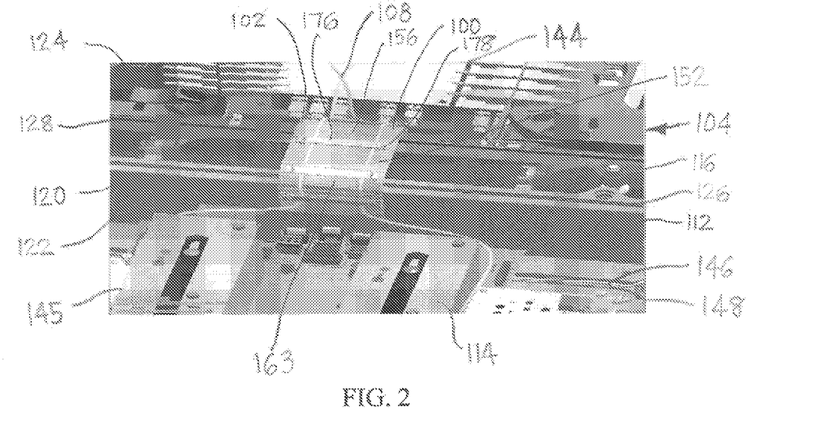
FIG. 2 is an enlarged perspective view of part of FIG. 1 showing the strand mounted HFC optical node in the open position with the optical fiber management bridge in accordance with principle of the present disclosure.
Figure 3:
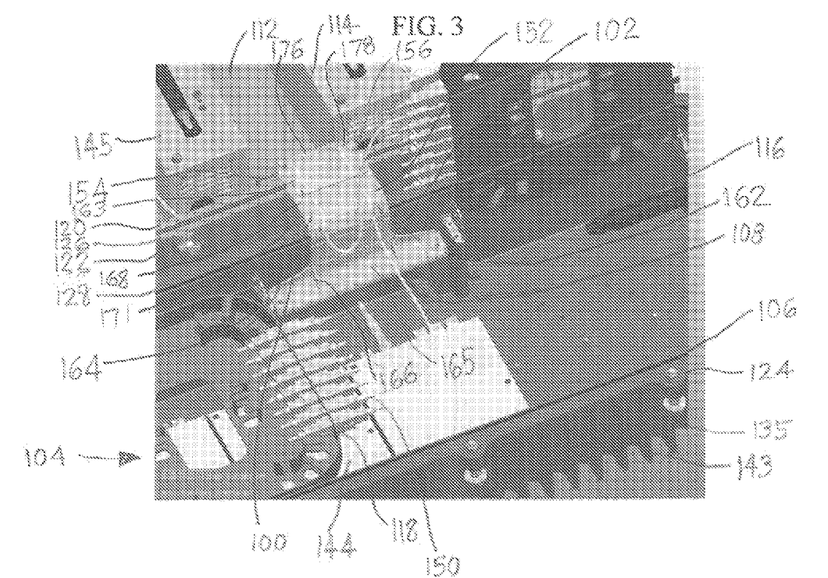
FIG. 3 is an enlarged perspective view of part of the strand mounted hybrid fiber-coaxial (HFC) optical node in the open position with the optical fiber management bridge as viewed in the opposite direction from FIG. 2 in accordance with principle of the present disclosure.
Figure 6:
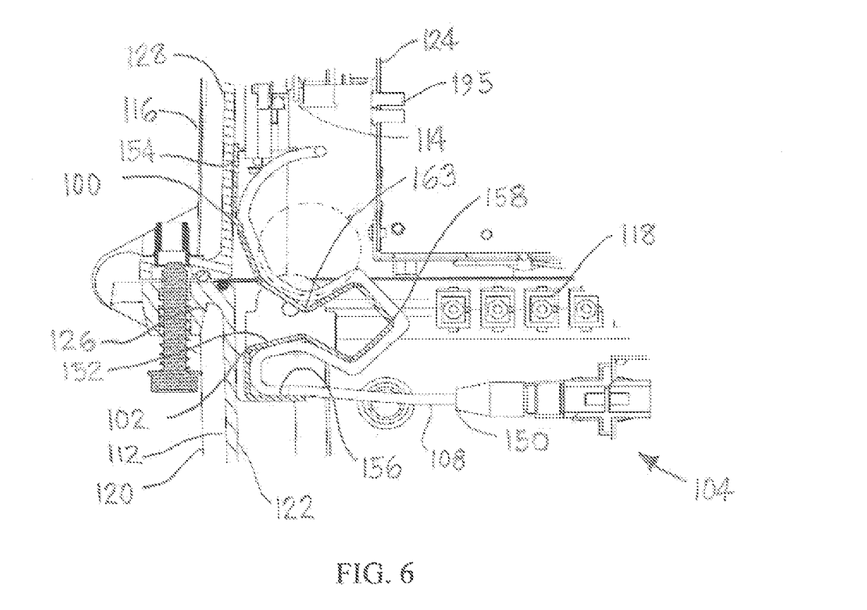
FIG. 6 is a cross-sectional view of the HFC optical node and optical fiber management bridge in a closed position in accordance with principles of the present disclosure.

The container can be fabricated of aluminum or other metal, or impact-resistant plastic or other materials. The container can comprise: a box, a water-resistant or waterproof box, an insulated box, a receptacle, an enclosure, a cabinet, or combinations of any of the preceding containers. The container can comprise a housing 120 (FIGS. 1-3) with movable and pivotable (pivotal) sections 122 and 124 having wall portions 126 and 128. The pivotable sections can be hinged, such as by auxiliary hinge segments and hinge pins, to each other along a hinge line 129. The moveable sections can include a base 122 providing a bottom 130 and a top 124 providing a lid 132. Each of the sections can have parallel longitudinal walls 134-137 including a front wall 134 or 135 providing a front and a rear wall 136 or 137 providing a back and can have lateral walls 138-141 including side walls 138 or 139 and 140 or 141 which can extend laterally between and integrally connect the longitudinal walls. The container can be moveable and pivotable from an open position as shown in FIGS. 1-3 to access the e-pack to a closed position as shown in FIG. 6 to cover and enclose the e-pack. As shown in FIGS. 1 and 3, the base and top portions of the container can have an array, set or series of similar size parallel cooling fins 142-143 that extend outwardly from the housing to dissipate heat generated by the e-pack.

The e-pack can comprise a broadband optical receiver 142 (FIG. 1) that can provide a forward receiver module for converting downstream optical modulated signals to electrical signals upstream towards a customer's location. The e-pack can also comprise a broadband optical transmitter 144 providing a return path transmitting module for converting upstream electrical signals from the customer's location to optical signals towards a downstream optical path. The e-pack and modules can also include electronic circuitry 146 with electronic components 148. The e-pack and optical package can also include optical fibers 108 with fiber optic connectors 150 (FIG. 6). At least some of the optical fibers can be routed and extend across the hinge line between the base and top of the housing of the container.

An elongated optical living hinge 152 (FIGS. 1-6) providing the optical bridge 100 can be secured to the base and top for pivotally and hingeably connecting the base and top. The optical bridge can have an abutment surface 154 which can be abuttingly positioned and secured against wall portions of the base and top. The optical bridge can also have an optical fiber-supporting surface 156 positioned opposite the abutment surface, to provide an optical bed for supporting, cushioning and receiving portions of the optical fibers that are routed and extend between the top and bottom of the housing. The optical fiber-supporting surface can also have an intermediate convex portion 158 (FIG. 6) for controlling a bend radius of the optical fibers in the closed position of the hinge and container.

Fiber optic cables are susceptible to producing excessive signal attenuation if the bend radius of the fiber is exceeded. In some cases, permanent failure of the fiber optic cable may occur if the bend radius is exceeded. The result may be customer complaints and service outages. The unique mechanical guide design disclosed herein may secure multiple fiber cables, keep them from being pinched during lid closings, and/or precisely control the position of the fibers, preventing them from exceeding the critical bend radius.

Figure 4:
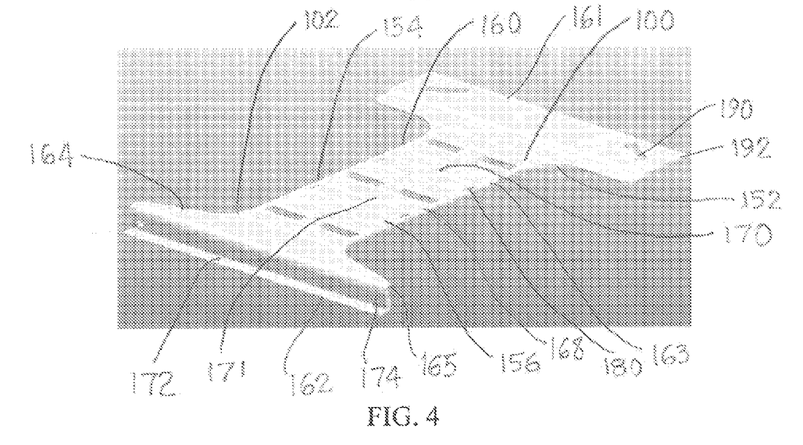
FIG. 4 is an enlarged perspective view of the optical fiber management bridge in accordance with principle of the present disclosure.

As shown in FIG. 4, the optical bridge can comprise: a generally I-shaped optical bridge 160 in a flattened or expanded position with an overhead portion 161 secured to one of the pivotable sections, a base portion 162 secured to another of the pivotable sections, and an elongated intermediate narrower optical portion 163 that extends between and connecting the overhead and base portions. The overhead and base portions can have a greater transverse span than the intermediate portion. The intermediate portion can have a greater height or length than the overhead portion and base portion. The base portion can have: an elongated flange 164 that extends longitudinally and is integrally connected to the intermediate portion, a transverse mounting panel 165 that can be positioned at an angle of inclination, such as at a right angle, to and integrally connected to the flange, and reinforcement ribs 166 (FIG. 5) which can extend between and are integrally connected to the flange and the mounting panel at the base portion and the overhead portion. The base portion and overhead portion each can have a greater transverse span than the intermediate portion. The intermediate portion can have a longer length than the base portion and the overhead portion.

Figure 5:
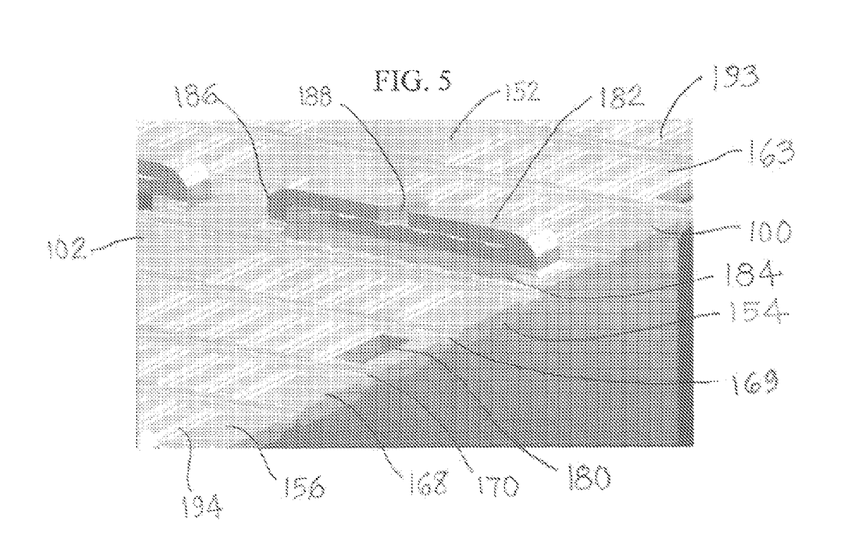
FIG. 5 is a much enlarged perspective view of a portion of the optical fiber management bridge in accordance with principles of the present disclosure.

As shown in FIG. 5, the intermediate portion of the optical bridge can comprise a set, series, array and/or matrix of generally rectangular transverse hinge segments 168 comprising a set of interconnected hinged panels which provide strips that can be pivotally and hingeably connected to each other along bend lines (hinge lines) 169 by transverse hinge portions 170 having a thickness less than the hinge segments for accommodating bending and flexing and further controlling the fiber bend radius of the optical fibers in the closed position of the housing and bridge.

An elongated generally rectangular transverse bar 172 (FIG. 4) can be provided for abuttingly positioning against the base portion to help reinforce and secure the base mounting panel of the base portion to one of the wall portions. The bar can be made of reinforced, plastic, metal or wood. The bar can also have fastener holes 174 providing openings near the end portions of the bar which can be aligned with mounting holes in the base mounting panel of the base portion to receive fasteners to help secure the bar and base portion to the container.

As shown in FIG. 3, optical fasteners, such as comprising elongated rectangular transverse crimped fiber-fastening bars 176 with inwardly extending U-shaped crimped end portions 178 that can snap or be pressed fit into lateral slots 180 (FIG. 4) which provide optical fastener-receiving openings at the end portions of the intermediate portion of the optical bridge, can be provided to secure the optical fibers to the bed of the fiber-supporting surface of the bridge. In some circumstances, it may be desirable to use twist ties, harnesses, straps, or clamps instead of or with the fastening bars.

As shown in FIG. 5, the intermediate portion of the optical bridge can have elongated transverse raised fiber-supporting sections 182 positioned along, adjacent and in proximity to the optical fasteners and elongated transverse openings 184 that provide transverse slots. The raised fiber-supporting section can have curved rounded ends 186 and an intermediate central notched section 188 to snugly receive, cradle and hold the optical fibers. In use, the optical fibers are wound, positioned, and/or routed under the optical fasteners and then positioned and cradled and thereafter extended and routed over the raised section.

The overhead portion of the optical bridge can also have diagonal openings 190 (FIG. 4) comprising diagonal slots near the corners 192. The bridge can be perforated or have perforations 193 that can be punched out, knocked out, or opened to provide for the various opening in the bridge as discussed herein. The bridge can also have raised elongated segments 194 for reinforcement that can provide longitudinal seats for supporting the optical fibers.

In the preferred embodiment for best results, the optical hinge comprises an elongated flexible elastomeric resilient bridge comprising polypropylene with a thickness less than about 0.15 inch to accommodate over 1 million flexings.

In the illustrative embodiment of FIG. 1, the container can have plugs 195 and can be strand mounted on existing cable infrastructure 196 to extend high performance wireless access to fixed locations or nomadic and mobile users.

The optical fiber management bridge can be used with existing network structure and can repurpose existing housings. The optical fiber management bridge can provide an excellent upgrade for a broadband network to help increase bandwidth capacity, support additional high definition (HD) channels and deliver more video on demand (VOD).

Among the many possible advantages of the optical fiber management bridge are:
1. Superior capability.
2. Superb performance.
3. Provides an optical hinge that goes over the hinge-line which will protect the fiber from getting pinched.
4. Excellent control of the fiber bend radius in a closed node position.
5. Outstanding optical bridge ability inside a housing which the fiber can reside safely in while the node is opened and closed.
6. Allow for a safe transition for the fiber over the hinge-line.
7. Accommodates optical modules to be installed in the base side of the node.
8. Provides a unique solution that addresses the major issues with current forms of optical fiber management within a strand mounted node.
9. Controls the bend radius of the secured fibers.
10. Provides a bridge made of flexible material.
11. Can be installed at the hinge-line of the optical node.
12. The fiber can safely reside in the bridge and still allow the node to open and close properly.
13. Can have a predefined shape when the node is open and when closed will flex and roll inside of the node.
14. Provides a safe hinge crossing for stress sensitive fiber jumpers.
15. Reliable.
16. User friendly.
17. Easy to use.
18. Durable.
19. Economical.
20. Attractive.
21. Efficient.
22. Effective.

Although embodiments have been shown and described herein, it is to be understood that various modifications, substitutions, and rearrangements of parts, components, and/or process (method) steps, as well as other uses of the optical fiber management bridge can be made by those skilled in the art without departing from the novel spirit and scope of the invention.

What is claimed is:

1. An optical fiber management bridge comprising:
   an electronics communications device for use with a broadband network; said electronics communications device having a housing for enclosing an electronics package;
   said housing having moveable sections including a base providing a bottom and a top providing a lid, said housing being moveable from an open position to access said electronics package to a closed position to cover and enclose said electronic package;
   said electronics package comprising at least one optical module and optical fibers extending between said base and top of said housing;
   an optical hinge providing an optical bridge secured to said base and top for hingeably connecting said moveable sections, said bridge having surfaces positioned and secured against portions of said base and top and having an optical fiber-supporting surface for supporting and receiving portions of said optical fibers extending between said top and bottom of the housing;
   said optical bridge comprising a generally I-shaped optical bridge in a flattened or expanded position having an overhead portion providing a top panel secured to one of said moveable sections, a base portion secured to another of said moveable sections, and an elongated optical intermediate narrower portion extending between and connecting said overhead and base portions;
   said base portion having a flange integrally connected to said intermediate portion, a transverse mounting panel positioned at an angle of inclination to and integrally connected to said flange, and reinforcement ribs extending between and integrally connected to said flange and said mounting panel;
   said base potion and said overhead portion each having a greater transverse span than said intermediate portion; and
   said intermediate portion having a longer length than said base portion and said overhead portion.

2. An optical fiber management bridge in accordance with claim 1 wherein:
   said housing has a hinge line; and
   said optical hinge has an intermediate portion for accommodating safe transition of the optical fibers over said hinge line of said housing.

3. An optical fiber management bridge in accordance with claim 1 wherein said electronics communications device is selected from the group consisting of: an optical node, a hybrid fiber-coaxial (HFC) optical node, a strand mounted wireless node, an optical hub, an optical amplifier, a wavelength division multiplexing module, an electronic communication module, a digital television broadcast module, a digital video transmitter, a digital video receiver, a digital video transceiver, a digital video streaming device, a telecommunications device, and combinations of any of the preceding.

4. An optical fiber management bridge in accordance with claim 1 wherein said optical module is selected from the group consisting of an optical amplifier, optical passives, and combinations of any of the preceding.

5. An optical fiber management bridge in accordance with claim 1 wherein said bridge comprises an optical bed upon which said optical fibers lie in the open and closed positions.

6. An optical fiber management bridge in accordance with claim 1 wherein said hinge comprises a flexible bridge having a predetermined expanded shape when said housing is open and having a contracted bent shape when the housing is closed for accommodating flexing and rolling inside said housing.

7. An optical fiber management bridge in accordance with claim 1 wherein said optical fibers are selected from the group consisting of single mode optical fibers, multiple mode optical fibers, fiber optic cables, fiber jumpers, and combinations thereof.

8. An optical fiber management bridge in accordance with claim 1 wherein said bridge provides a safe hinge crossing for stress sensitive fiber jumpers.

9. An optical fiber management bridge in accordance with claim 1 including:
   optical fasteners for securing said optical fibers to said bridge, and
   said optical fasteners are selected from the group consisting of twist ties, harnesses, straps, and clamps.

10. An optical fiber management bridge in accordance with claim 1 wherein:
    said optical bridge comprises a material selected from the group consisting of polypropylene and polyethylene; and
    said optical bridges comprise an optical bed for cushioning portions of said optical fibers.

11. An optical fiber management bridge comprising:
    a broadband network comprising a broadband access network (BAN) with optical fibers for providing broadband communications;
    said BAN comprising an optical module with an electronics package (e-pack) in a container;
    said container comprising a housing with pivotable sections having wall portions including a base providing a bottom and a top providing a lid, said container being moveable and pivotable from an open position to access said e-pack to a closed position to cover and enclose said e-pack;
    said e-pack comprising a broadband optical receiver providing a forward receiver module for converting downstream optical signals to electrical signals upstream towards a customer's location, a broadband optical transmitter providing a return path transmitting module for converting upstream electrical signals from the customer's location to optical signals towards a downstream optical path, said modules comprising electronic circuitry with electronic components, said e-pack including optical fibers with fiber optic connectors and at least some of said optical fibers extending between said base and top of said container; and
    an optical hinge providing an optical bridge secured to said base and top for pivotally connecting said base and top, said bridge having surfaces positioned and secured against portions of said base and top and having an optical fiber-supporting surface providing an optical bed for cushioning and receiving portions of said optical fibers extending between the top and bottom of the housing;
    wherein said optical bridge comprises an elongated flexible elastomeric resilient bridge comprising polypropylene with a thickness less than about 0.15 inch to accommodate over 1 million flexings.

12. An optical fiber management bridge in accordance with claim 11 wherein said optical module is selected from the group consisting of: an optical amplifier, optical passives, an optical node, a hybrid fiber-coaxial (HFC) optical node, a strand mounted wireless node, an optical hub, an optical amplifier, a wavelength division multiplexing module, an electronic communication module, a digital television broadcast module, a digital video transmitter, a digital video receiver, a digital video transceiver, a digital video streaming device, a telecommunications device, and combinations of any of the preceding.

13. An optical fiber management bridge in accordance with claim 11 wherein said broadband communications are selected form the group consisting of: digital communications, digital television, high definition television (HDTV), digital video, digital video streaming, video on demand (VOD), analog communications, analog television, data transmission, internet communications, radio frequency (RF) communications, telephone communications, computer communications, telecommunications, and combinations of any of the preceding.

14. An optical fiber management bridge in accordance with claim 11 wherein and said optical fiber-supporting surface comprises an intermediate convex portion for controlling a bend radius of said optical fibers in the closed position.

15. An optical fiber management bridge in accordance with claim 11 wherein:
  said optical fibers are selected from the group consisting of single mode optical fibers, multiple mode optical fibers, fiber optic cables, fiber jumpers, and combinations thereof;
  said optical bridge is selected from the group consisting of: an elongated optical bridge, a flexible optical bridge, an elastomeric optical bridge, a resilient optical bridge, and combinations of any of the preceding; and
  said optical bridge comprises a material selected from the group consisting of polypropylene and polyethylene.

16. An optical fiber management bridge comprising:
  a broadband network comprising a hybrid fiber-coaxial (HFC) broadband access network (BAN) with optical fibers and coaxial cable for providing digital communications;
  said BAN comprising a HFC optical module with an electronics package (e-pack) in a container;
  said container comprising a housing with pivotable sections having wall portions including a base providing a bottom and a top providing a lid, said container being moveable and pivotable from an open position to access said e-pack to a closed position to cover and enclose said e-pack;
  said e-pack comprising a broadband optical receiver providing a forward receiver module for converting downstream optical modulated signals to electrical signals upstream towards a customer's location, a broadband optical transmitter providing a return path transmitting module for converting upstream electrical signals from the customer's location to optical signals towards a downstream optical path, electronic circuitry with electronic components, and optical fibers with fiber optic connectors, and at least some of said optical fibers extending between said base and top of said housing of said container; and
  an elongated optical living hinge providing an optical bridge secured to said base and top for pivotally connecting said base and top, said bridge having an abutment surface abuttingly positioned and secured against wall portions of said base and top and having a optical fiber-supporting surface providing an optical bed for supporting, cushioning, and receiving portions of the optical fibers that are routed and extend between said top and bottom of said housing, and said optical fiber-supporting surface having an intermediate convex portion for controlling a bend radius of said optical fibers in the closed position;
  wherein said digital communications are selected from the group consisting of: digital television, high definition television (HDTV), digital video, digital video streaming, video on demand (VOD), data transmission, internet communications, radio frequency (RF) communications, telephone communications, computer communications, telecommunications, and combinations of any of the preceding;
  wherein said HFC optical module are selected from the group consisting of an optical amplifier, optical passives, a HFC optical node, a strand mounted wireless node, and combinations thereof;
  wherein said optical fibers are selected from the group consisting of: single mode optical fibers, multiple mode optical fibers, fiber optic cables, fiber jumpers, and combinations thereof;
  wherein said container is selected form the group consisting of: a box, a water-resistant box, an insulated box, a receptacle, an enclosure, a cabinet, and combinations of any of the preceding; and
  wherein said container has an array of cooling fins extending outwardly from said housing to dissipate heat.

17. An optical fiber management bridge comprising:
  a broadband network comprising a hybrid fiber-coaxial (HFC) broadband access network (BAN) with optical fibers and coaxial cable for providing digital communications;
  said BAN comprising a HFC optical module with an electronics package (e-pack) in a container;
  said container comprising a housing with pivotable sections having wall portions including a base providing a bottom and a top providing a lid, said container being moveable and pivotable from an open position to access said e-pack to a closed position to cover and enclose said e-pack;
  said e-pack comprising a broadband optical receiver providing a forward receiver module for converting downstream optical modulated signals to electrical signals upstream towards a customer's location, a broadband optical transmitter providing a return path transmitting module for converting upstream electrical signals from the customer's location to optical signals towards a downstream optical path, electronic circuitry with electronic components, and optical fibers with fiber optic connectors, and at least some of said optical fibers extending between said base and top of said housing of said container;
  an elongated optical living hinge providing an optical bridge secured to said base and top for pivotally connecting said base and top, said optical bridge having an abutment surface abuttingly positioned and secured against wall portions of said base and top and having a optical fiber-supporting surface providing an optical bed for supporting, cushioning, and receiving portions of the optical fibers that are routed and extend between said top and bottom of said housing, and said optical fiber-supporting surface having an intermediate convex portion for controlling a bend radius of said optical fibers in the closed position;
  said optical bridge comprising a generally I-shaped optical bridge in a flattened or expanded position having an overhead portion providing a top panel secured to one of said pivotable sections, a base portion secured to another of said pivotable sections, and an elongated optical intermediate narrower portion extending between and connecting said overhead and base portions;

said base portion having a flange integrally connected to said intermediate portion, a transverse mounting panel positioned at an angle of inclination to and integrally connected to said flange, and reinforcement ribs extending between and integrally connected to said flange and said mounting panel;

said base potion and said overhead portion each having a greater transverse span than said intermediate portion; and said intermediate portion having a longer length than said base portion and said overhead portion.

18. An optical fiber management bridge comprising:

a broadband network comprising a hybrid fiber-coaxial (HFC) broadband access network (BAN) with optical fibers and coaxial cable for providing digital communications;

said BAN comprising a HFC optical module with an electronics package (e-pack) in a container;

said container comprising a housing with pivotable sections having wall portions including a base providing a bottom and a top providing a lid, said container being moveable and pivotable from an open position to access said e-pack to a closed position to cover and enclose said e-pack;

said e-pack comprising a broadband optical receiver providing a forward receiver module for converting downstream optical modulated signals to electrical signals upstream towards a customer's location, a broadband optical transmitter providing a return path transmitting module for converting upstream electrical signals from the customer's location to optical signals towards a downstream optical path, electronic circuitry with electronic components, and optical fibers with fiber optic connectors, and at least some of said optical fibers extending between said base and top of said housing of said container;

an elongated optical living hinge providing an optical bridge secured to said base and top for pivotally connecting said base and top, said optical bridge having an abutment surface abuttingly positioned and secured against wall portions of said base and to and having a optical fiber-supporting surface providing an optical bed for supporting, cushioning, and receiving portions of the optical fibers that are routed and extend between said top and bottom of said housing, and said optical fiber-supporting surface having an intermediate convex portion for controlling a bend radius of said optical fibers in the closed position;

an elongated generally rectangular bar for abuttingly positioning against said base portion to help reinforce and secure said base portion to one of said wall portions;

optical fasteners for securing said optical fibers to said bed, said optical fasteners selected from the group consisting of crimped fastening bars comprising elongated transverse bars with crimped end portions, twist ties, harnesses, straps, clamps, and combinations of any of the preceding;

said elongated intermediate portion of said optical bridge defining openings to receive portions of said optical fasteners;

said optical intermediate portion having raised section with notched central portion positioned in proximity to said optical fasteners for lifting, cradling and snugly holding portion of said optical fibers; and said elongated intermediate portion comprising a set of generally rectangular transverse hinge segments comprising a set of interconnected hinged panels pivotally connected by transverse hinge portions having a thickness less than said hinge segments for accommodating bending, flexing and further controlling the fiber bend radius of the optical fibers in the closed position.

19. An optical fiber management bridge comprising:

a broadband network comprising a hybrid fiber-coaxial (HFC) broadband access network (BAN) with optical fibers and coaxial cable for providing digital communications;

said BAN comprising a HFC optical module with an electronics package (e-pack) in a container;

said container comprising a housing with pivotable sections having wall portions including a base providing a bottom and a top providing a lid, said container being moveable and pivotable from an open position to access said e-pack to a closed position to cover and enclose said e-pack;

said e-pack comprising a broadband optical receiver providing a forward receiver module for converting downstream optical modulated signals to electrical signals upstream towards a customer's location, a broadband optical transmitter providing a return path transmitting module for converting upstream electrical signals from the customer's location to optical signals towards a downstream optical path, electronic circuitry with electronic components, and optical fibers with fiber optic connectors, and at least some of said optical fibers extending between said base and top of said housing of said container; and an elongated optical living hinge providing an optical bridge secured to said base and top for pivotally connecting said base and top, said optical bridge having an abutment surface abuttingly positioned and secured against wall portions of said base and top and having a optical fiber-supporting surface providing an optical bed for supporting, cushioning, and receiving portions of the optical fibers that are routed and extend between said top and bottom of said housing, and said optical fiber-supporting surface having an intermediate convex portion for controlling a bend radius of said optical fibers in the closed position;

wherein said optical bridge comprises an elongated flexible elastomeric resilient bridge comprising polypropylene with a thickness less than about 0.15 inch to accommodate over 1 million flexings.

\* \* \* \* \*